(12) United States Patent
Al Shehri et al.

(10) Patent No.: US 10,871,444 B2
(45) Date of Patent: Dec. 22, 2020

(54) INSPECTION AND FAILURE DETECTION OF CORROSION UNDER FIREPROOFING INSULATION USING A HYBRID SENSORY SYSTEM

(71) Applicant: Saudi Arabian Oil Company, Dhahran (SA)

(72) Inventors: Ali Al Shehri, Thuwal (SA); Vincent Cunningham, Thuwal (SA); Ayman Amer, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/214,615

(22) Filed: Dec. 10, 2018

(65) Prior Publication Data

US 2020/0072744 A1    Mar. 5, 2020

Related U.S. Application Data

(63) Continuation-in-part of application No. 16/117,937, filed on Aug. 30, 2018.

(51) Int. Cl.
  *G01N 21/35* (2014.01)
  *G01N 21/3581* (2014.01)
  (Continued)

(52) U.S. Cl.
  CPC ....... *G01N 21/3581* (2013.01); *G01N 17/006* (2013.01); *G01N 21/3563* (2013.01); *G01N 21/55* (2013.01); *G01N 22/04* (2013.01)

(58) Field of Classification Search
  CPC ............. G01N 21/3581; G01N 17/006; G01N 21/3563
  See application file for complete search history.

(56) References Cited

U.S. PATENT DOCUMENTS 7,902,524 B2  3/2011  Safai et al.
8,596,861 B2  12/2013  Kane et al.
(Continued)

FOREIGN PATENT DOCUMENTS

CN    204086134 U   1/2015
JP    2018025497 A  2/2018

OTHER PUBLICATIONS

Malhotra Pankaj, et al., "Long Short Term Memory Networks for Anomaly Detection in Time Series", ESANN (2015) pp. 89-94.
"Corrosion Under Insulation and Fireproofing", American Petroleum Institute, API Recommended Practice 583, Second Edition, 2019.

(Continued)

*Primary Examiner* — Hugh Maupin
(74) *Attorney, Agent, or Firm* — Leason Ellis LLP

(57) ABSTRACT

A system for predicting and detecting of corrosion under fireproof insulation (CUF) in an infrastructure asset comprises a first detection apparatus adapted to capture thermal images of the asset, a second detection apparatus adapted to receive THz radiation from the asset, and at least one ambient condition sensor for detecting environmental conditions at a location of the asset, a communication device coupled to the first and second detection apparatus and at least one ambient condition sensor to receive data therefrom and adapted to communicate the received data, and a computing device communicatively coupled to the communication device and configured with instructions for executing a machine learning algorithm taking as inputs the thermal image, THz and ambient condition data received from the communication device, and to output a CUF prediction regarding the asset.

20 Claims, 11 Drawing Sheets

(51) Int. Cl.
*G01N 17/00* (2006.01)
*G01N 21/55* (2014.01)
*G01N 22/04* (2006.01)
*G01N 21/3563* (2014.01)

(56) References Cited

U.S. PATENT DOCUMENTS

| | | | |
|---|---|---|---|
| 9,518,918 | B2 | 12/2016 | Mann et al. |
| 9,874,516 | B2 | 1/2018 | Mann et al. |
| 2004/0257464 | A1 | 12/2004 | Pandit et al. |
| 2005/0098728 | A1 | 5/2005 | Alfano et al. |
| 2010/0033565 | A1 | 2/2010 | Benzerrouk et al. |
| 2010/0107767 | A1 | 5/2010 | Kane et al. |
| 2012/0279599 | A1* | 11/2012 | Gluskin .............. G01N 17/02 138/97 |
| 2013/0037420 | A1 | 2/2013 | Funahashi |
| 2014/0208163 | A1 | 7/2014 | Domke et al. |
| 2015/0381948 | A1 | 12/2015 | Renkis |
| 2016/0284075 | A1 | 9/2016 | Phan et al. |
| 2016/0343106 | A1 | 11/2016 | Hoole et al. |
| 2017/0176343 | A1 | 6/2017 | Krishnan |
| 2017/0336323 | A1 | 11/2017 | Mann et al. |
| 2018/0284735 | A1* | 10/2018 | Cella .............. G05B 19/41875 |
| 2018/0335404 | A1 | 11/2018 | Amer et al. |
| 2019/0293552 | A1* | 9/2019 | Georgeson ......... G01N 21/8806 |
| 2019/0339150 | A1* | 11/2019 | Schiavone .......... G01N 21/954 |

OTHER PUBLICATIONS

Bello, Opeyemi, et al. "Application of artificial intelligence techniques in drilling system design and operations: a state of the art review and future research pathways." SPE Nigeria Annual International Conference and Exhibition. Society of Petroleum Engineers, 2016.

Ibarra-Castanedo, Clemente, et al. "Thermographic nondestructive evaluation: overview of recent progress." Thermosense XXV. vol. 5073. International Society for Optics and Photonics, 2003.

Sakagami, Takahide, et al. "Nondestructive evaluation technique using infrared thermography and terahertz maging." Thermosense: Thermal Infrared Applications XXXVIII. vol. 9861. International Society for Optics and Photonics, 2016.

International Search Report and Written Opinion in Corresponding Patent Application PCT/US19/065477 dated Mar. 2, 2020. 14 pages.

Agarwala, Vinod S., Perry L. Reed, and Siraj Ahmad. "Corrosion detection and monitoring—A review." Corrosion 2000. NACE International, 2000.

Prabhu, D. R., and W. P. Winfree. "Neural network based processing of thermal NDE data for corrosion detection." Review of progress in quantitative nondestructive evaluation. Springer, Boston, MA, 1993. 775-782.

International Search Report and Written Opinion in Corresponding Patent Application No. PCT/US2019/049154 dated May 29 2020. 21 pages.

Written Opinion of the International Preliminary Examining Authority in Corresponding PCT Application No. PCT/US2019/049154 dated Sep. 17, 2020. 7 pages.

* cited by examiner

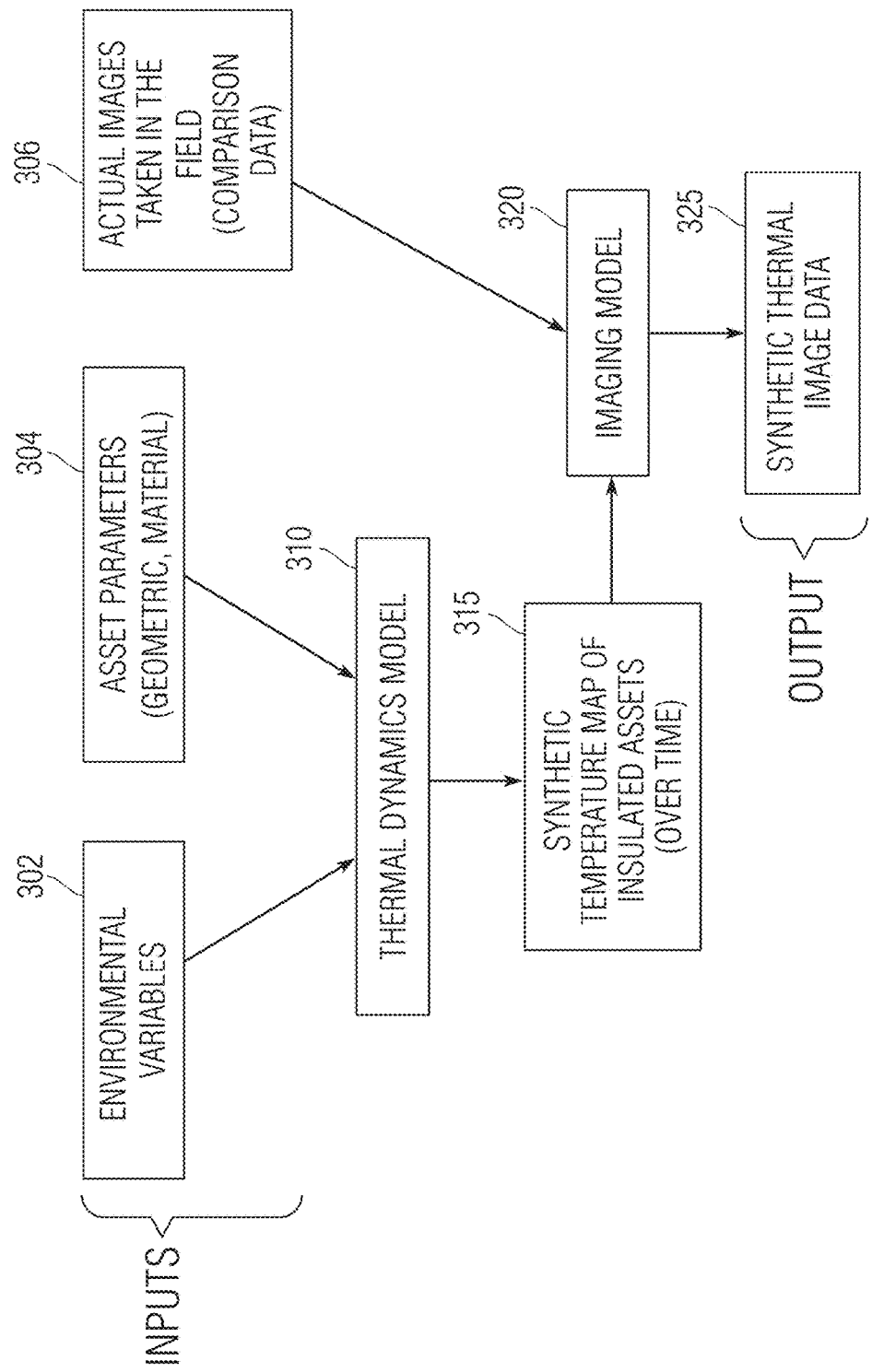

INSPECTION AND FAILURE DETECTION OF CORROSION UNDER FIREPROOFING INSULATION USING A HYBRID SENSORY SYSTEM

CROSS-REFERENCE TO RELATED APPLICATIONS

This application is a continuation-in-part of commonly-assigned and co-pending U.S. patent application Ser. No. 16/117,937 ('937 application), filed on Aug. 30, 2018 and entitled "Cloud-based machine learning system and data fusion for the prediction and detection of corrosion under insulation." The '937 application is incorporated by reference in its entirety for any purpose.

FIELD OF THE INVENTION

The present invention relates to inspection technologies, and, more particularly, relates to a system and method for inspection and failure detection of corrosion-under-fireproofing insulation (CUF) using hybrid sensing.

BACKGROUND OF THE INVENTION

Corrosion under insulation (CUI), such as fireproof insulation, is a condition in which an insulated structure such as a metal pipe suffers corrosion on the metal surface beneath the insulation. As the corrosion cannot be easily observed due to the insulation covering, which typically surrounds the entire structure, CUI is challenging to detect. The typical causes of CUI are moisture buildup that infiltrates into the insulation material. Water can accumulate in the annular space between the insulation and the metal surface, causing surface corrosion. Sources of water that can induce corrosion include rain, water leaks, and condensation, cooling water tower drift, deluge systems and steam tracing leaks. While corrosion usually begins locally, it can progress at high rates if there are repetitive thermal cycles or contaminants in the water medium such as chloride or acid.

When CUF is undetected, the results can lead to the shutdown of a process unit or an entire facility and can ultimately lead to catastrophic incidents. Conventionally, corrosion damage is assessed by physically removing predefined portions of insulation from an installation, followed by resealing the insulation after inspection. The equipment underneath the removed insulation is then visually inspected. At large and complex installations, such as the facility shown in FIG. 6, insulation removal and visual inspection can require extensive scaffolding to allow personnel to reach all locations subject to inspection. The construction expenses this entails adds greatly to the time and cost of the inspection process. Additionally, removal of sections of insulation is typically a somewhat random, hit-or-miss process, since it is not known ahead of time which sections of equipment have experienced considerable erosion. The outcome of the inspection can therefore be considered insufficiently reliable as it is based on random sampling.

Due to these challenges, it has been found that localized visual inspections of assets are not reliably effective at detecting CUF, and they do not reflect conditions of the assets. Accordingly, there is a pressing need for improved detection and risk assessment tools to determine levels of CUF damage and reduce the burdensome costs imposed by this problem.

It is with respect to these and other considerations that the disclosure made herein is presented.

SUMMARY OF THE INVENTION

Embodiments of the present invention provide a system for predicting and detecting of corrosion under fireproof insulation (CUF) in an infrastructure asset. The system comprises a first detection apparatus adapted to capture thermal images of the asset, a second detection apparatus adapted to receive terahertz (THz) radiation from the asset, at least one ambient condition sensor for detecting environmental conditions at a location of the asset, a communication device coupled to the first and second detection apparatus and at least one ambient condition sensor to receive data there from and adapted to communicate the received data, and a computing device communicatively coupled to the communication device and configured with instructions for executing a machine learning algorithm taking as inputs the thermal image, THz data and ambient condition data received from the communication device, and to output a CUF prediction regarding the asset.

The first detection apparatus can include an infrared camera, and the second detection apparatus can include a THz emitter and a THz detector. In some implementations, at least one ambient sensor is operative to detect at least one of temperature, humidity and air pressure.

In certain implementations, machine learning algorithm employed by the computing system includes a deep convolutional neural network. In other implementations, the machine learning algorithm employed by the at least one computing system includes a deep recurrent neural network. In further implementations, the machine learning algorithm employed by the computing system further includes both a deep convolutional neural network and a deep recurrent neural network.

The computing system can also be configured with instructions for executing a boosting algorithm, such as Adaboost to increase prediction accuracy.

In some arrangements in the field, the first detection apparatus can be positioned in a range of about 5 to about 15 meters away from the asset while detecting infrared radiation coming from the asset, and the second detection apparatus can be positioned in a range of 0.1 to about 2.1 meters away from the asset while detection THz radiation coming from the asset.

Embodiments of the present invention also provide a method of predicting and detecting of corrosion under fireproof insulation (CUF) in an infrastructure asset. The method comprises capturing thermal image data emitted or reflected from the asset over time, capturing THz data of the asset reflected from the asset over time, measuring ambient conditions to obtain ambient condition data over time, communicating the captured thermal image, THz and ambient condition data to a computing system configured with a supervised machine learning algorithm, and executing the machine learning algorithm using the thermal image, THz and ambient condition data. The execution of the machine learning algorithm yields a prediction as to whether the asset contains corrosion under fireproofing.

In some arrangements in the field, the step of capturing thermal image data is performed by positioning an infrared detector between about 5 meters to about 15 meters away from the asset. In further arrangements in the field, the step of capturing THz data is performed by positioning a THz emitter and THz detector between about 0.1 meters to about 2.2 meters away from the asset.

In some implementations, the ambient condition data includes at least one of least one of temperature, humidity and air pressure.

In some embodiments, the step of executing the machine learning algorithm includes employing a convolutional deep neural network to classify thermal image and THz data. In some embodiments, the step of executing the machine learning algorithm further includes employing a recurrent neural network to analyze the thermal image and THz data over time in view of the ambient condition data. In further embodiments, the step of executing the machine learning algorithm includes employing both a convolutional deep neural network to classify thermal image and THz data and a recurrent deep neural network to analyze the thermal image and THz data over time in view of the ambient condition data.

Some implementations of the method further comprise executing a boosting algorithm, such as Adaboost, to increase accuracy of the machine learning algorithm.

These and other aspects, features, and advantages can be appreciated from the following description of certain embodiments of the invention and the accompanying drawing figures and claims.

BRIEF DESCRIPTION OF THE DRAWINGS

FIG. 4 is a block flow diagram illustrating a method for generating synthetic thermal image data structures according to an exemplary embodiment of the present invention.

DETAILED DESCRIPTION OF CERTAIN EMBODIMENTS OF THE INVENTION

Embodiments of the present invention provide a predictive approach for detecting corrosion under insulation (CUI) taking into account dependent and independent surrounding variables. Thermal images of investigated assets are captured over time.

As thermal images are captured over time, changes in phenomena can be readily observed, including the impact of temporary issues such as wind. The thermal images show temperature gradients indicative of locations vulnerable to CUI. Additional evaluations are performed with an independent non-destructive testing (NDT) technique, such as, for example, electromagnetic detection using a magnetometry sensor, to determine correlative relationships. This "sensor fusion" increases the accuracy of CUI detection, shadow detection, or abnormal process activities, the effects of which can be minimized. Ambient condition data such as the time of day, weather, process conditions, etc. are included as parameter inputs to machine learning algorithms that are used to generate conclusions from the multiple sources of input. Additionally, in some embodiments, to reduce the effects of "noise" in the thermal images caused by shadows, reflections or other artifacts, a noise filter can be employed as a preprocessing step.

Through the combination of sensor fusion and time-based analysis non-determinative or confounding variables can be excluded, allowing the learning algorithms to zero-in on anomalies that are contrary to ambient conditions, and thus are more likely indicative of CUI. Such anomalies are recorded; afterwards field engineers can perform a verification inspection upon the locations where such anomalies occur. The results of the field inspection (i.e., a "CUI verified" or "CUI not verified") can be stored on cloud-based platforms and used to train supervised machine learning systems, enabling the systems to become more 'intelligent' over time as parameters (weights, factors) are refined over time by a continually more encompassing data set.

Figure 1:
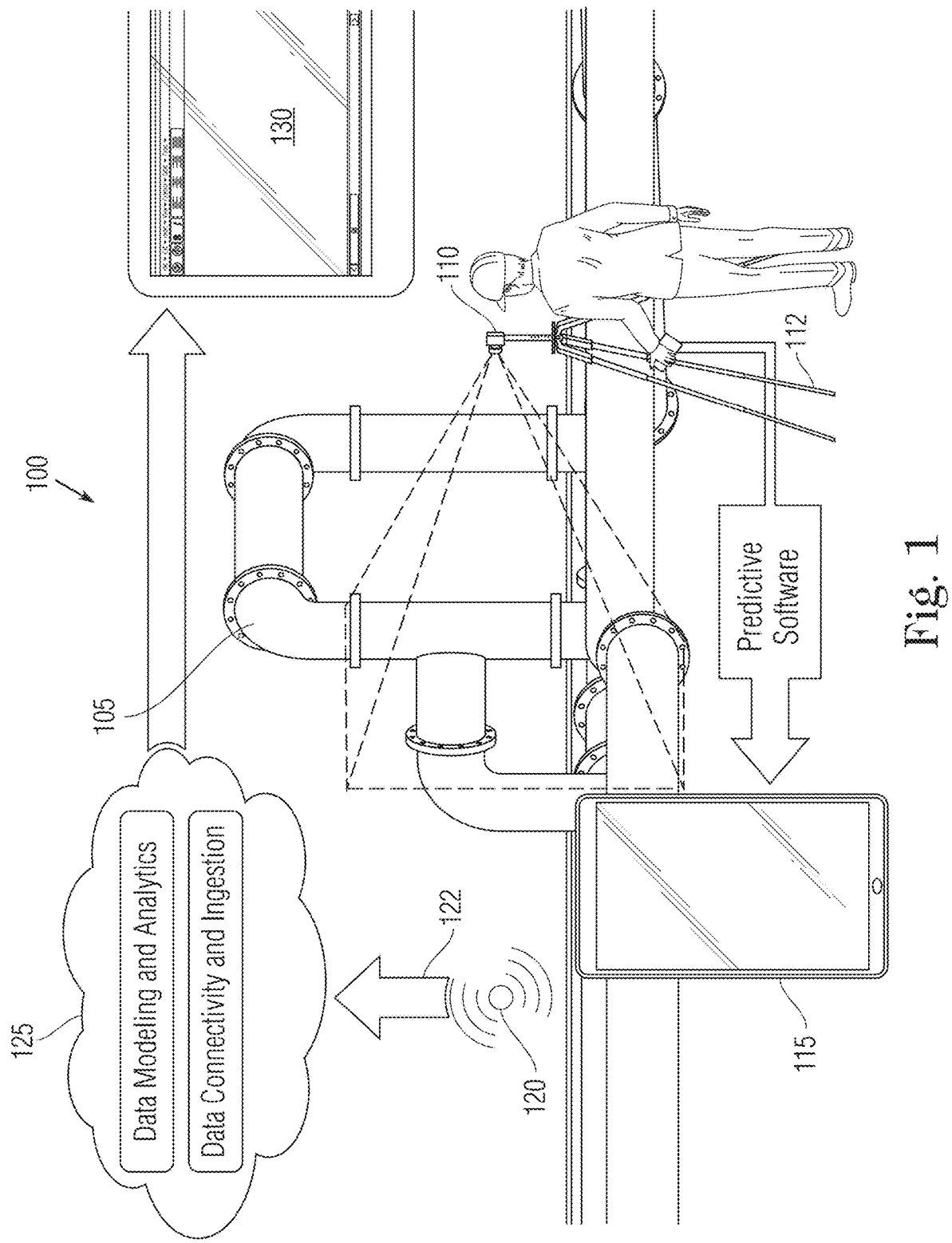
FIG. 1 is a schematic illustration of a cloud-based learning system for predicting and detecting CUI according to an embodiment of the present invention.

FIG. 1 is a schematic illustration of a cloud-based learning system 100 for prediction and detection of CUI according an embodiment of the present invention. FIG. 1 shows an exemplary structure 105 to be tested, in this case a set of insulated pipes. The insulated pipes of this example can comprise a metallic pipe conduit surrounded by one or more layers of insulation. Corrosion, when it occurs, tends form in the annular region between the insulation and the metallic pipe where moisture can become trapped and accumulate. In FIG. 1, one or more infrared cameras 110 (only one camera is shown in the figure) are situated proximally to the structure 105 to capture infrared radiation and record thermal images emitted from the structure. One example of a suitable infrared camera for CUI detection is the C3 Wi-Fi enabled thermal camera supplied by FLIR Systems, Inc. of Wilsonville, Oreg., although other devices can also be used. The thermal images captured from the structure 105 reveal internal thermal contrasts within the structure that are undetectable in the visible spectrum radiation and can be indicative of moisture accumulation and/or corrosion. The infrared camera 110 preferably captures thermal images received from regions of the structure continuously over a selected duration, and/or intermittently at different times or dates. The camera 110 is adapted to convert the thermal images into a standardized computer-readable file format (i.e., thermograph files, jpgs).

The infrared camera 110 is positioned on a mount 112, which as described in greater detail below, can be "smart" and have a variety of components and functions. In some embodiments, the mount can be implemented as a tripod. The mount 112 can be extendable to reach high elevations on the structure (e.g., by telescoping) and can include a mechanical head fixture coupling to the camera that has several degrees of freedom to pan and tilt at various angles with respect to a fixed plane. Field technical personal can set the extension and orientation of the mount head to capture thermal images from different areas of the structure, as required.

In some facilities, identification tags can be posted on assets, or portions thereof. The precise geographical location of each tag can be determined using GPS. The identification tags can be implemented using image-based tags such as QR codes that are readable from a distance. To take advantage of the tagging feature, in some embodiments, a standard camera can be included along with the infrared camera on the mount to scan tags on the assets. Depending on the size of tags (of known size) in the image, distances from the camera to the tags can be determined. Tagging enables simultaneous scanning and localization of the facility assets without the need to create complex three-dimensional CAD models of the facility.

The infrared camera 110 can be physically and communicatively coupled to the mount 112 (e.g., wirelessly by Bluetooth or Wi-Fi communication). The mount 112 also includes or is coupled to one or more additional detectors, such as electromagnetic sensors (not shown in FIG. 1), which can be used to probe the structure and obtain supplemental readings to complement the data obtained by thermal imaging. In this manner, data from two or more distinct and independent sensing modes can be combined, referred to as "sensor fusion", that can make downstream prediction and detection much more robust by reduction of false positive classifications. The mount 112 also includes sensors for detecting ambient conditions including temperature, humidity, and air pressure. Received thermal images can be associated with the ambient conditions and the current time at which the ambient conditions are recorded. This data comprises parameters used by the machine learning algorithms that contribute to the interpretation and classification of the thermal images captured from the structure.

The mount 112 is communicatively coupled to a computing device 115, which can be a tablet, laptop or any other suitable computing device with sufficient processing and memory capability that can be conveniently taken onsite in the field for use by field technical professionals. The mount 112 is operative to transmit thermographic files received from the camera 110 to the computing device 115. The computing device 115 preferably stores executable applications for preprocessing and predictive analysis. Preprocessing can include image filtering steps for reducing noise in the images that can arise from many causes. The computer device also executes one or more machine learning algorithms that take the received thermograph files (thermal images) as inputs and output a prediction as to the probability that the thermal images contain anomalies of interest in real time. As discussed in related commonly-owned application, U.S. patent application Ser. No. 15/712,490, entitled "Thermography Image Processing with Neural Networks to Identify Corrosion Under Insulation (CUI)", a plurality of machine learning algorithms, including deep learning algorithms can be used for CUI detection. In some implementations, convolutional networks, which are useful for classifying images in detail, are used in a first stage, and recurrent neural networks, which are useful for tracking changes over time, are used in an additional stage. The computing device 115 provides the output of the machine learning algorithms in an application user interface that can be conveniently consulted by field technical personnel. Real time predicative analysis in the field allows field technical personal to support observations and focus rapidly on high-risk areas of the structure that are more likely subject to corrosion damage.

The computing device 115 communicates wirelessly via a network switch 120 (via wireless communication network 122) with a cloud computing platform 125. Wireless network 122 can be a wireless local area network (WLAN), wireless wide area networks (WWAN), cellular networks or a combination of such networks. The cloud computing platform 125 comprises computing resources, typically dynamically allocated, including one or more processors (e.g., one or more servers or server clusters), that can operate independently or collaboratively in a distributed computing configuration. The cloud computing platform 125 includes database storage capacity for storing computer-executable instructions for hosting applications and for archiving received data for long term storage. For example, computing device 115 in the field can upload all thermal image and other data received to the cloud computing platform 125 for secure storage and for further processing and analysis. More specifically, the computing device 115 can format and send data records in, for example, MySQL or another database format. An example database record can include, among other fields, a tagged asset location, a series of thermal images taken over time at a particular asset location (or a link thereto), the data value for the camera's ID (cameraID) of the camera that captured the thermal images, the time/date at which each image was captured, ambient conditions at the time/date (e.g., temperature), sensor fusion data (e.g., electromagnetic sensor data). The cloud database can store include a detailed geographical mapping of the location and layout of the infrastructure assets (e.g., from LiDAR data) and applications executed on the cloud platform can perform detailed analyses that combine the sensor data and predictive analyses with the detailed mapping of the assets to make risk assessments covering entire structures or groups of structures. Reports of such assessments and results of other processing performed at the cloud computing platform 125 are accessible to a control station 130 communicatively coupled to the cloud computing platform. In alternative embodiments, it is possible for the smart mount 112 to format and transmit the received data to the cloud computing platform directly before analysis of the data is performed on site.

Figure 2:
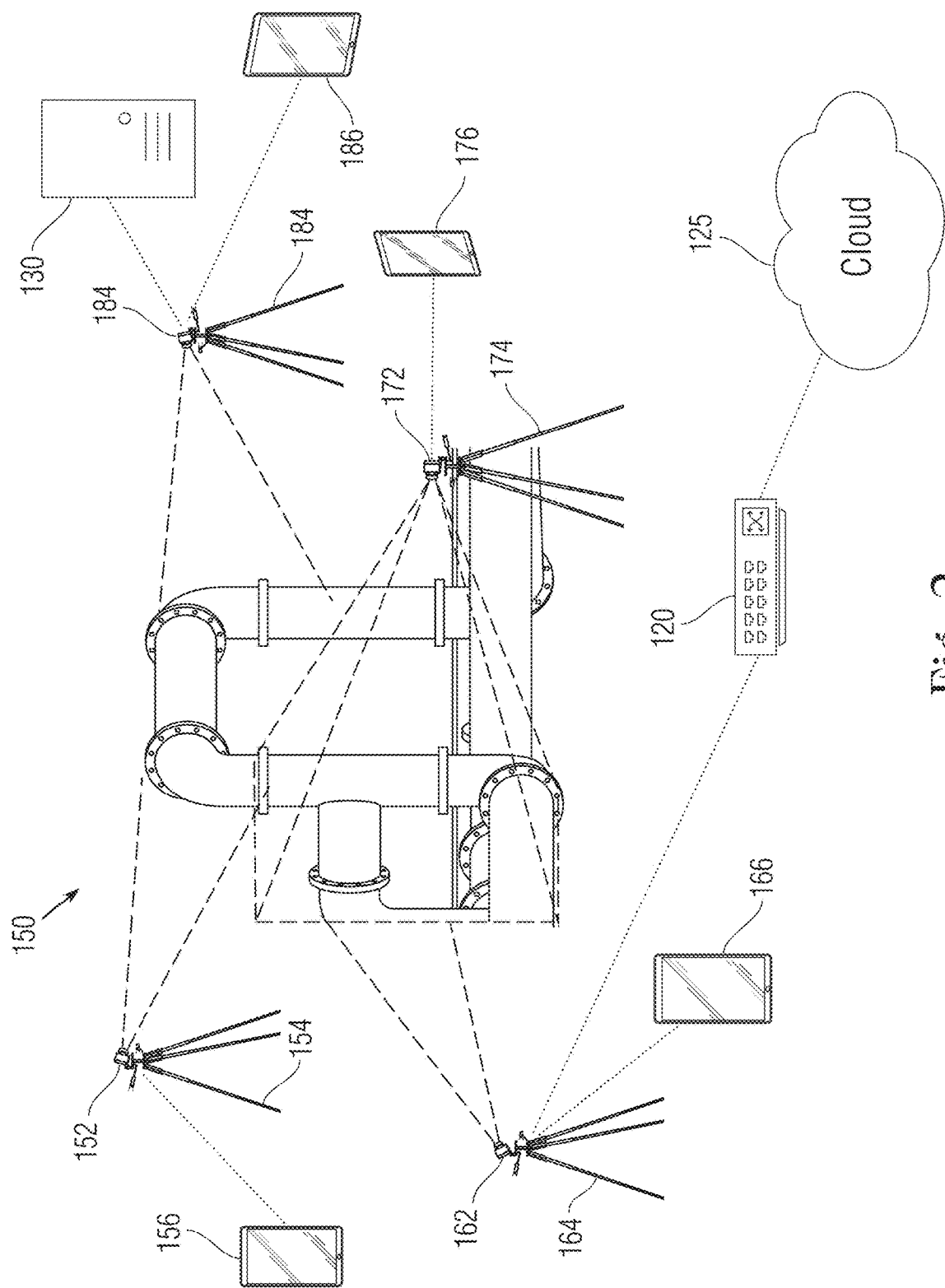
FIG. 2 is a schematic illustration of an embodiment of the cloud-based system in which four infrared cameras and corresponding smart mounts and computing devices are deployed to monitor a structure for CUI.

FIG. 2 depicts an exemplary implementation of a cloud-based learning system for CUI prediction and detection more generally shown in FIG. 1. In FIG. 2, this system 150 includes four sets of cameras, mounts and computing devices ("investigative kits") positioned at various positions in proximity to structure 105 for capturing thermal image and other data. Although four investigative kits are used in this embodiment, it is again noted that fewer or a greater number of kits can be employed depending, for example, on the size of the structure or installation investigated. More specifically, the system 150 is configured using a first infrared camera 152 associated with a first mount 154 and first computing device 156 positioned at a first location; a second infrared camera 162 associated with a second mount 164 and second computing device 166 positioned at a second location; a third infrared camera 172 associated with a third mount 174 and third computing device 176 positioned at a third location; and a fourth infrared camera 182 associated with a fourth mount 184 and fourth computing device 186 positioned at a forth location proximal to the asset 105. Two-way wireless communications can be supported by all the mounts and computing devices of the system, each of which can thus communicate with each other. For example, thermal image data received by the computing devices 156, 166, 176, 186, can be transmitted to the cloud computing platform 125 via network switch 120, and to control station 130. Alternatively, the smart mounts 154, 164, 174, 184 can communicate directly with the control station when wireless connectivity is available. By providing redundant connectivity, each smart mount or computing device in the system can act as a communication node in a multi-node system, so that if one or more of the mounts or computing devices loses connectivity with the control station, data can be forwarded to other nodes that maintain connectivity. The control station 130 is configured to provide configuration and control commands to the smart mounts 154, 164, 174, 184 or computing devices 156, 166, 176, 186.

Figure 3:
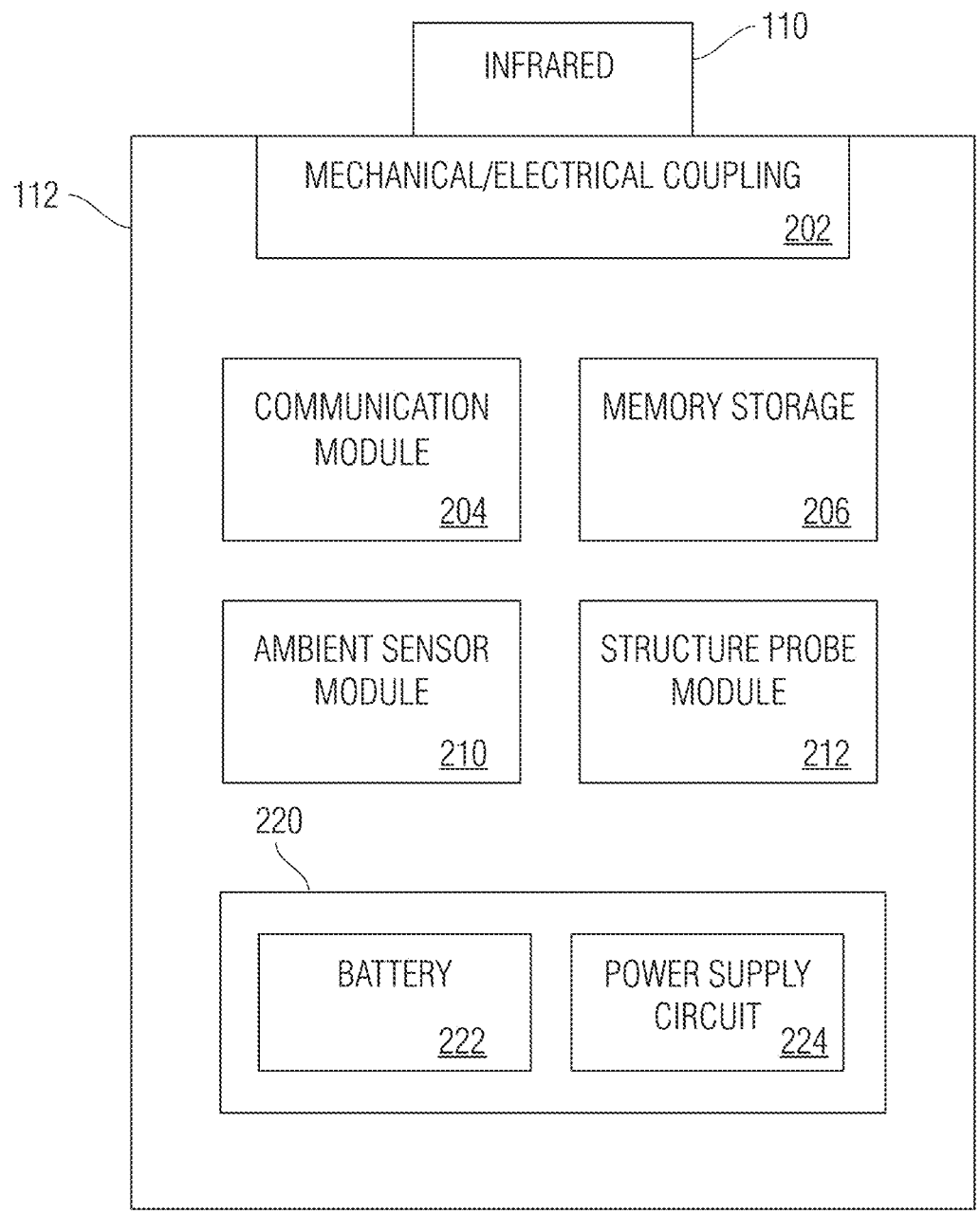
FIG. 3 is a block diagram showing functional elements of a smart mount according to an exemplary embodiment of the present invention.

FIG. 3 is a block diagram showing functional elements of a smart mount according to an exemplary embodiment of the present invention. The smart mount 112 includes a camera coupling or mount 202 by means of which the infrared camera 110 can be securely mechanical affixed and electrically connected to the mount 112. As noted above, the camera coupling 202 can include expandable and rotatable elements, such as telescoping shafts, and various joints with degrees of freedom for enabling the camera to be translated and tilted to a desired position and orientation. In some implementations, the smart mount can be supported on a counterweighted movable to provide a steering sub-system on the ground.

To enable inter-communication with other elements of the system, the smart mount 112 also includes a communication module 204 which can include an antenna, a transceiver, and electronic components configured to support two-way wireless communication with other smart mounts, computing devices, and the control station 130. The smart mount also includes a memory module 206 which can be implemented using SSD card memory. If the infrared cameras are mounted in locations where signal obstructions result in suboptimal data rates that are inferior to the actual thermal image streaming rate, the onboard memory module can be used to store the thermal image stream to provide latency while the wireless attempts to support the data download.

The smart mount 112 further includes an ambient sensor module 210 that can include temperature, humidity and pressure sensors. An additional structural probe sensor module 212 includes detectors that can be used to probe the structure for CUI using modes distinct from thermal imaging, including, without limitation, magnetic (magnetometry) and ultrasonic detectors. Together with the thermal images from the infrared camera, the structural probe sensor module provides the sensor fusion that enhances CUI prediction and risk assessment. An electrical power module 220 includes a battery module 222 of sufficient size to provide electrical power for the smart mount components and to charge the infrared camera battery via a power supply circuit 224 for a suitable data gathering period before requiring recharging. A suitable duration for data gathering can be for example, about 45 minutes to about 90 minutes. Larger or smaller batteries can be employed for longer or shorter data gathering periods.

In operation, the field computing devices receive (ingest) thermal image, probe sensor and ambient condition data from the infrared cameras and smart mounts. The initial data ingest can be affected by conditions at the site, including, shadows, reflections and spurious signals. Before executing machine learning algorithms, it can be useful to filter incoming data for noise using noise filtering mechanism integrated within the software as a preprocessing step to filter out noise and amplify the signal-to-noise ratio. In some embodiments, ingested data can be filtered by dimensionality reduction and autoencoding techniques. In other embodiments, linear or non-linear smoothing filters can be applied instead of or in addition to dimensionality reduction techniques. The noise filtering step helps discriminate CUI signals from shadows, reflections as well as normal near infrared thermal signals. While such noise and other artifacts in the data can be eventually recognized and compensated for in the machine learning process using multi-context embedding in the neural network stage, it can be more time and resource efficient to preprocess the data by filtering in this manner.

Another refinement which can be used to enhance robustness to noise, is the introduction of synthetic training data to supplement data taken from the field. Mathematical models including finite element analyses are based on the thermal dynamics of insulated metal structures and on thermal images taken in the field as a basis for calibration and comparison. The synthetic data can be to simulate and augment the thermal image training dataset. The synthetic data can also make the learning system more robust to different environmental conditions such as weather conditions, temperature, exposure to sun light, and material temperature behind the insulation, for example. The synthetic data can be generated locally by the computing devices or the cloud computing platform. In either case the synthetic data can incorporated in the training and application database at the cloud computing platform.

FIG. 4 is a block flow diagram illustrating a method for generating synthetic thermal image data structures according to the present invention for supplementing a training set for a predictive machine learning model. The inputs for generating synthetic thermal images include environmental variables 302 (e.g., temperature, humidity, air pressure, time of day), asset parameters 304 (e.g., dimensions, position, material, insulation), and a set of thermal images 306 of various assets captured in the field ("field thermographs"). The environmental variables 302 and asset parameters 304 are input to a thermal dynamics model 310 that uses known thermodynamic properties of materials based on environmental conditions to generate a synthetic temperature map 315 of insulated assets over time, based on a random probability distribution of temperature and humidity conditions. The synthetic temperature map 315 and the field thermographs are inputs to an imaging model 320. While images can be created from the temperature map alone, the field thermographs can be used as a basis of calibration and comparison. As an example, if a temperature maps of assets exhibits a tendency toward greater temperature contrasts than shown in field thermographs of similar asset under similar conditions, the imaging model can make weighting adjustments to bring the temperature map closer to the field thermographs. After such adjustments are made, the imaging model generates a set of synthetic thermal images 325 that can be used to supplement the field thermographs during training.

Figures 5A, 5B:
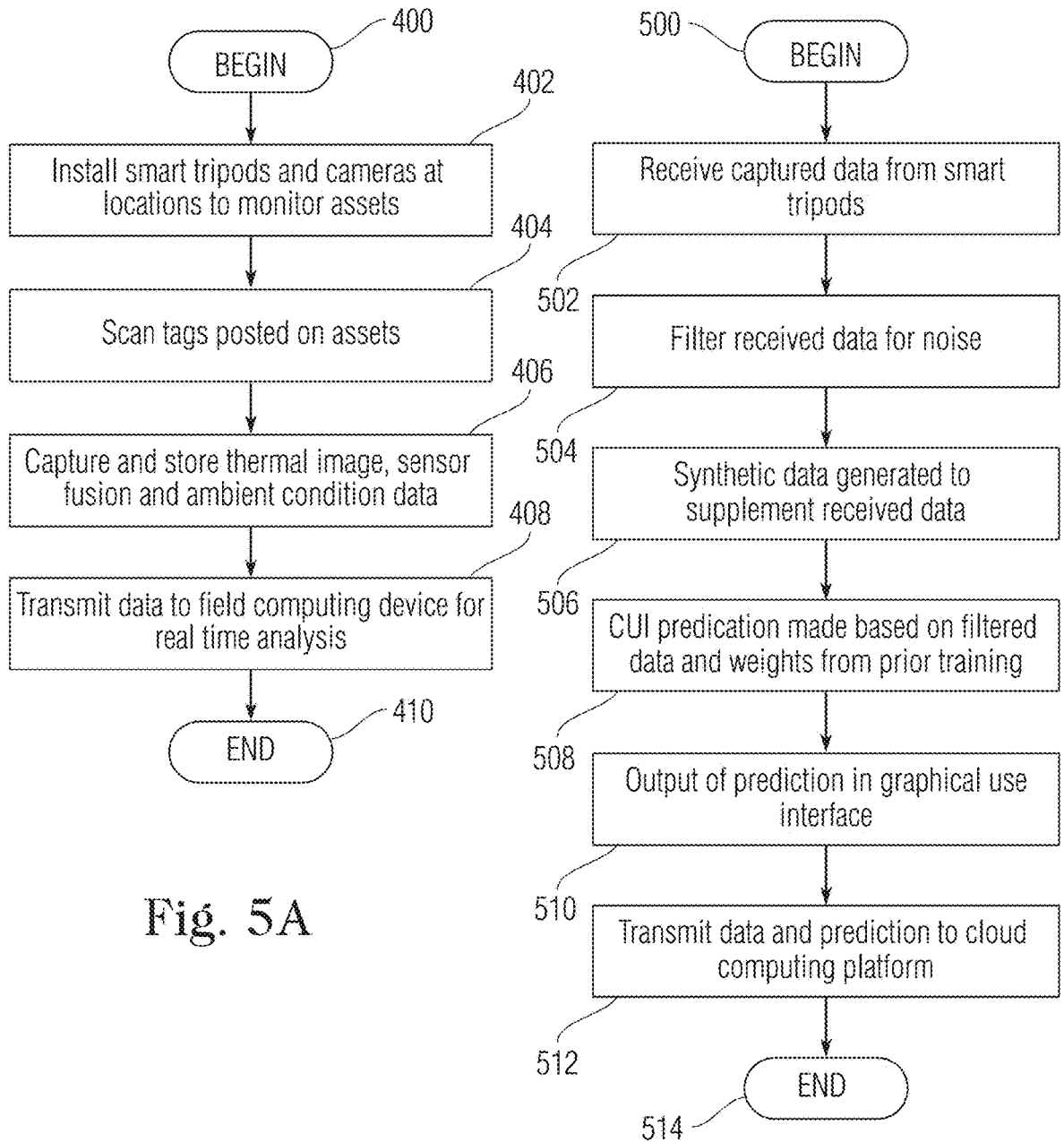
FIG. 5A is a flow chart of a method for acquiring data for CUI predication performed using an investigative kit according to an embodiment of the present invention.
FIG. 5B is a flow chart of a method of real time CUI prediction according to an embodiment of the present invention.
Figure 6:
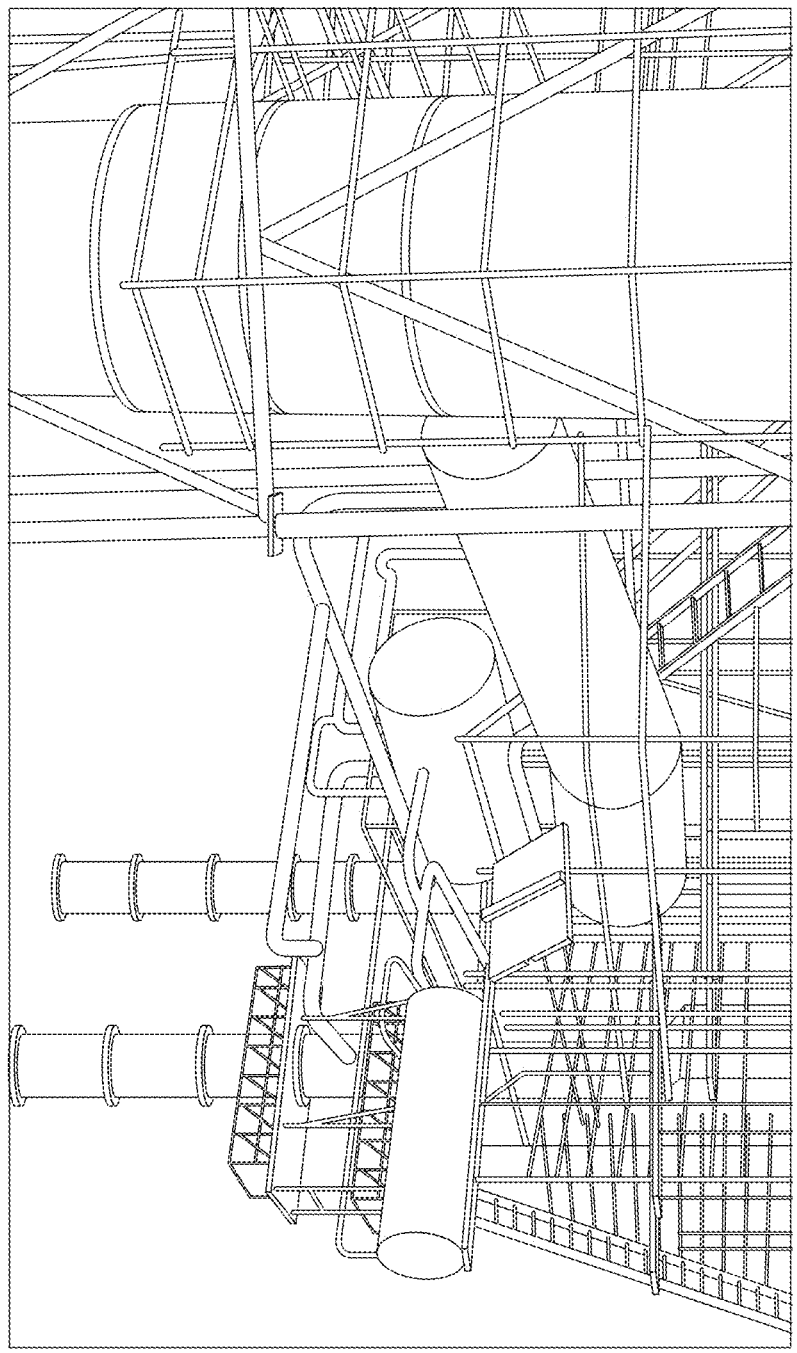
FIG. 6 is a perspective view of an exemplary scaffolded oil and gas facility.

FIG. 5A is a flow chart of a method for acquiring data for CUI predication performed using an investigative kit according to an embodiment of the present invention. The method begins in step 400. In step 402, smart mounts and cameras (infrared, standard) are installed at suitable locations to monitor assets at a facility. In step 404, any tags posted on the assets are scanned. In step 406, thermal image, sensor fusion, and ambient condition data are captured and stored in memory. In step 408, this information is transmitted to a local computing device for real time analysis. The method ends in step 410.

FIG. 5B is a flow chart of a method of real time CUI prediction according to an embodiment of the present invention. In step 500 the method begins. In step 502, the computing device receives the captured data from the smart mounts. In step 504, the received data is filtered for noise. In step 506, CUI prediction and detection is conducted using machine learning algorithms based on the filtered data and parameter weights from prior training. The machine learning algorithms can include deep learning techniques such as convolutional and recurrent neural networks. In an optional step 508, synthetic data is generated to supplement the data received from the smart mounts. In step 510, prediction output is generated on a graphical user interface to be viewed by field technical personnel. In a following step 512, the received data and the prediction output is transmitted to the cloud computing platform. In step 514, the method ends.

Sensor Fusion Using THz and Infrared Detectors

Figure 7:
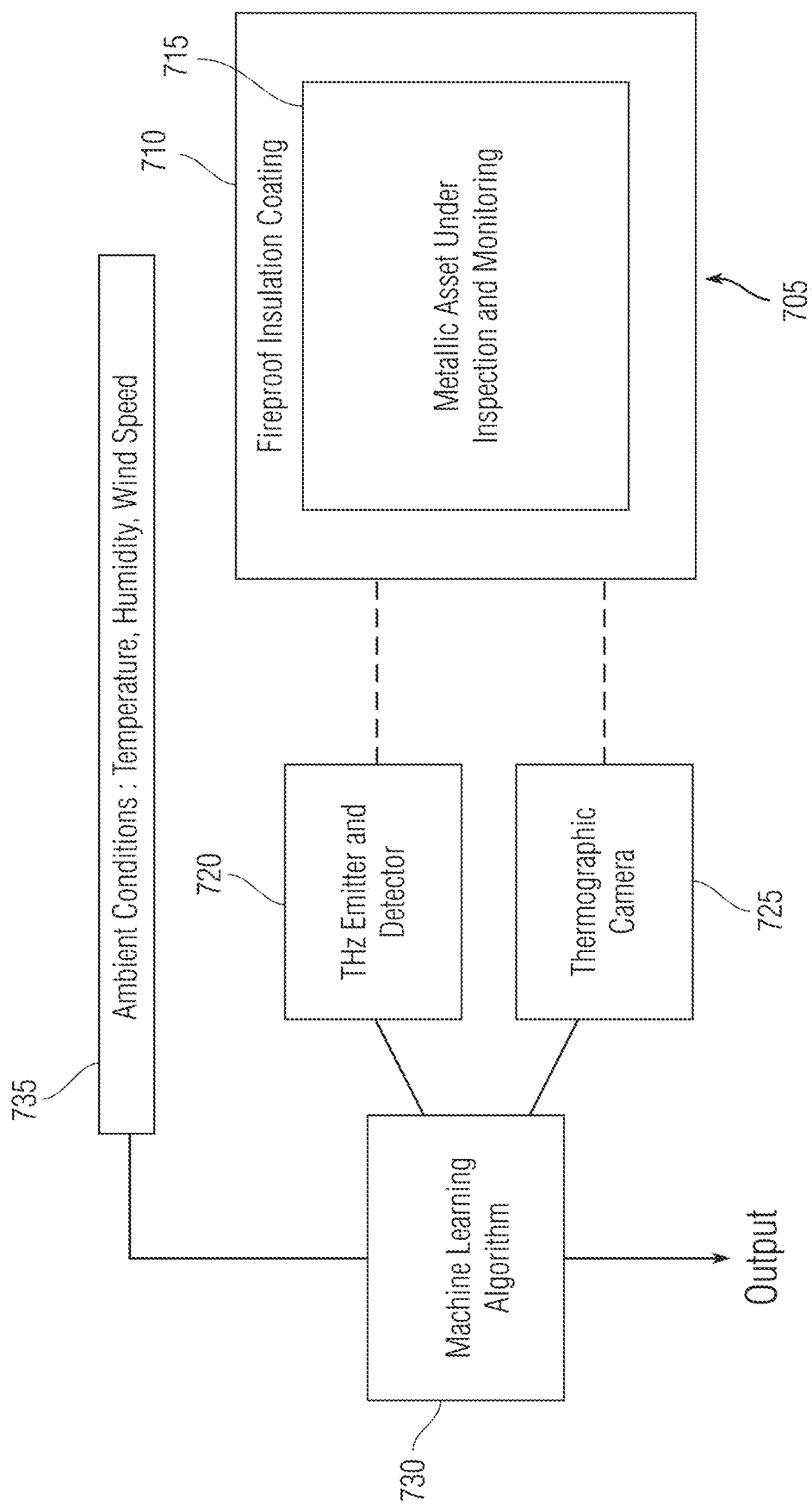
FIG. 7 is a block diagram of a system for detection of CUI or CUF according to another embodiment of the present invention.

FIG. 7 is a block diagram of a system for detection of CUI or CUF according to another embodiment of the present invention. A facility structure to be monitored 105 comprises an inner asset 710, which is typically a section of metallic equipment such as piping or a tank, and a covering of fireproof insulation 715, that surrounds the asset. The fireproof insulation can be composed of fiberglass, mineral wool, polystyrene foam, combinations thereof and other materials that are fire-resistant. A first detection apparatus 720 is positioned remotely (i.e., not in contact) from the structure 105. In the embodiment depicted, the first detection apparatus 720 includes a Terahertz emitter and detector. A second detection apparatus 725 is also positioned from remotely from the structure 105. In the embodiment depicted, the second detection apparatus 725 comprises an infrared camera. The first detection apparatus 720 can be positioned about 0.8 to about 2.2 meters away from the monitored structure to achieve optimal results, while the second detection apparatus 725 can be positioned further from the monitored structure to achieve optimal results, for example, up to about 10 meters. The first and second detector apparatus 720, 725 can be positioned and secured on a platform, or alternatively, can be placed on moving devices, such as a robotic drone, to remain in a particular location for a duration. While the duration persists, both the first and second apparatus 720, 725 can record a series detected THz and infrared signals over time. The signals received by the detector apparatus 720, 725 can be resolved and formatted into 2-dimensional images by the apparatus.

The first and second apparatus 720, 725 are communicatively coupled, via a wired connection or wirelessly, to a computing system 730 which executes a machine learning algorithm. THz and infrared image data acquired by the first and second detector apparatus is communicated offline and/or in real time to the computing system 730. The computing system 730 also receives data concerning ambient conditions at the facility such as temperature, humidity and windspeed from ambient condition sensors 735. The ambient condition sensors 735 are for measuring these conditions and, as known in the art, can be co-located with the detector apparatus or located elsewhere at or near the facility.

As described further below, the machine learning algorithm executed on computing system 730 is a learning system that improves in ability to determine whether a monitored structure has corrosion under fireproof insulation over time. In one implementation, an iterative supervised learning procedure is used in which the machine learning algorithm makes use of both THz and infrared images (along with ambient sensor data) as well as prior inspection results to determine learning model parameters. The learning model can then be used to predict whether newly monitored structures have CUF based on the images acquired by the first and second detection apparatus.

Figure 8B:
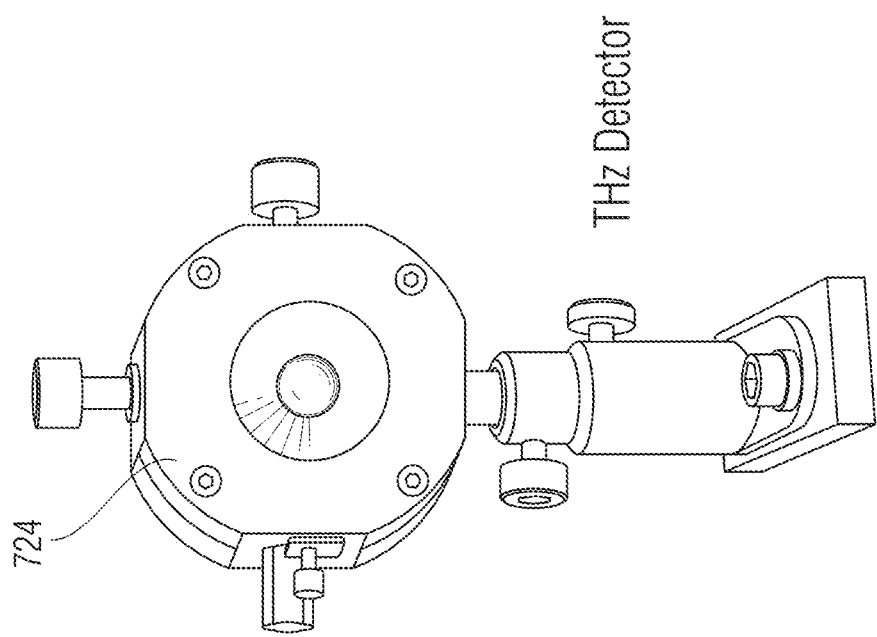
FIGS. 8A and 8B are perspective views of a Terahertz emitter (FIG. 8A) and Terahertz detector (FIG. 8B), respectively.
Figure 8A:
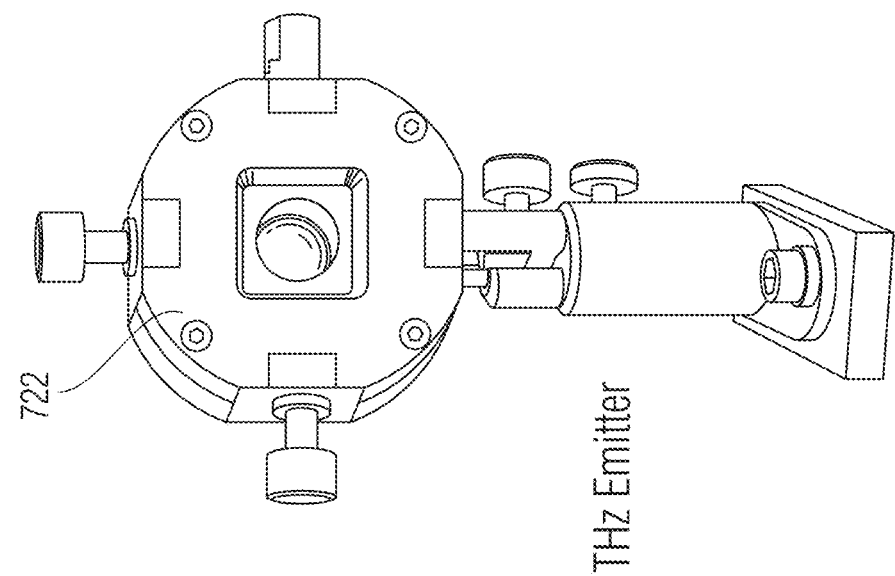

The first detection apparatus 720 can include a Terahertz (THz) source (emitter) and detector. Terahertz radiation, which is typically defined as the part of the electromagnetic spectrum ranging between about 0.3 and 20 THz, falls between the microwave and infrared portions of the electromagnetic spectrum and typically can penetrate materials such as textiles and plastics. Terahertz radiation is also non-ionizing and is relatively safe to employ for frequent inspections. Using the combination of an infrared sensor with a THz emitter and detector is particularly suitable for CUF inspection because of the way in which the two detection modes complement each other. FIGS. 8A and 8B are perspective views of an exemplary THz emitter 722 and THz detector 724, respectively, available from EKSPLA of Vilnius Lithuania. There are different types of THz emitters that operate to deliver broadband THz radiation based on different principles including the photo-Dember effect, current transients, optical rectification and quantum cascade lasers, among others. The quantum cascade laser technique uses a laser as an energy source to pump phonons to an energy at which THz is emitted. THz detectors typically detector current transients using a specialized antenna.

THz detection technology has the advantage that it can "see through" fireproof coating which is typically transparent to THz radiation to the metallic surface of the underlying asset. The metallic surface partially absorbs and reflects the THz radiation. The reflections are picked up the THz detector and converted into 2-dimensional data. To best capture the reflected THz radiation, the THz detection apparatus can be arranged so that both the THz detector and THz emitted are located on the same side of the monitored structure. The images are fed into the machine learning algorithm and an image analysis can be carried out to on the data determine the presence of corrosion. By contrast, the infrared detector apparatus 725 cannot see through the insulation coating but can detect thermal gradients on the surface of the structure. Variations in the thermal gradient observed at the surface are often caused by anomalies either on the metallic surface under inspection or within the insulation layer as thermal energy is conveyed to the surface of the structure.

Due to their differing characteristics, the THz detection mode of the first detector apparatus 720 and the infrared detection mode of the second detector apparatus 725 are complementary. Each apparatus, having a different detection technology, is designed to overcome challenges associated with the other of the sensor fusion pair. Terahertz detection via the first detection apparatus 720, typically has a lower resolution compared to infrared or visible light detection. Infrared thermography via the second detection apparatus 725 typically detects the presence of moisture and not degradation or corrosion of the metallic asset. Using sensor fusion with a machine learning system, the weakness of each can be compensated for using the other detection modality. For example, if it is found that thermal images depicting certain patterns of water intrusion often results in false positives with respect to corrosion damage (i.e., the water intrusion often is not associated with actual metal corrosion), the Terahertz images of the same feature can provide additional indications to the machine learning algorithms as to whether corrosion has occurred. In other words, when both THz and infrared images indicate the presence of corrosion damage, the likelihood is much greater that the indication is accurate than if only one of the two detection modalities is indicative of corrosion. In this manner, sensor fusion aids in reducing the rate of false positives and improving the rate of true positives.

To take readings from numerous assets and locations in a facility, the first and second apparatus can be moved manually or automatically. In some implementations, the first and second apparatus can be coupled to drones or crawling devices that can move along curved surfaces without falling. As the first and second apparatus are moved to different positions, THz readings at several or each location in a given space (i.e., a Cartesian space, x, y and z) and infrared images at corresponding locations can be obtained. The sensor data initially produces two sets of vector data $(x_1, y_1, z_1, i(THz)_1) \ldots (x_n, y_n, z_n, i(THz)_n)$ for the THz image data and $(x_1, y_1, z_1, i(\inf)_1) \ldots (x_n, y_n, z_n, i(\inf)_n)$ for the infrared image data. The two sets of data can be combined in a single vector, i.e., $(x_n, y_n, z_n, i(THz)_n, i(\inf)_n)$, when the data is captured from substantially the same location (i.e., there is no offset, or there is a finite offset, between the areas sensed by the THz and infrared sensors, respectively). As described further below, for each THz/infrared pair for a given location, the computing system makes a prediction as to whether the asset location has been subject to corrosion. The data mappings are thereby supplemented with a prediction obtained by feeding a prediction engine with a model such as, for example, $x_n, y_n, z_n, iTHz_n, i(\inf)_n$, Prediction$_n$. As predictions are determined over a large three-dimensional space at a facility, in some instances "hot" areas in which several data points in the same vicinity are associated with a positive prediction of corrosion can be identified. Likewise, contiguous areas in which comparatively less or no corrosion has been predicted can also be identified. Remedial measures can then be applied to such hot areas and not to the other areas in which comparatively less corrosion has been determined. In this manner, insulation removal and other remedial measures can be performed on specific sections in which there is a high probability of corrosion damage, eliminating the need to remove sections of insulation randomly or according to a statistical pattern to determine the presence of corrosion.

Figure 9:
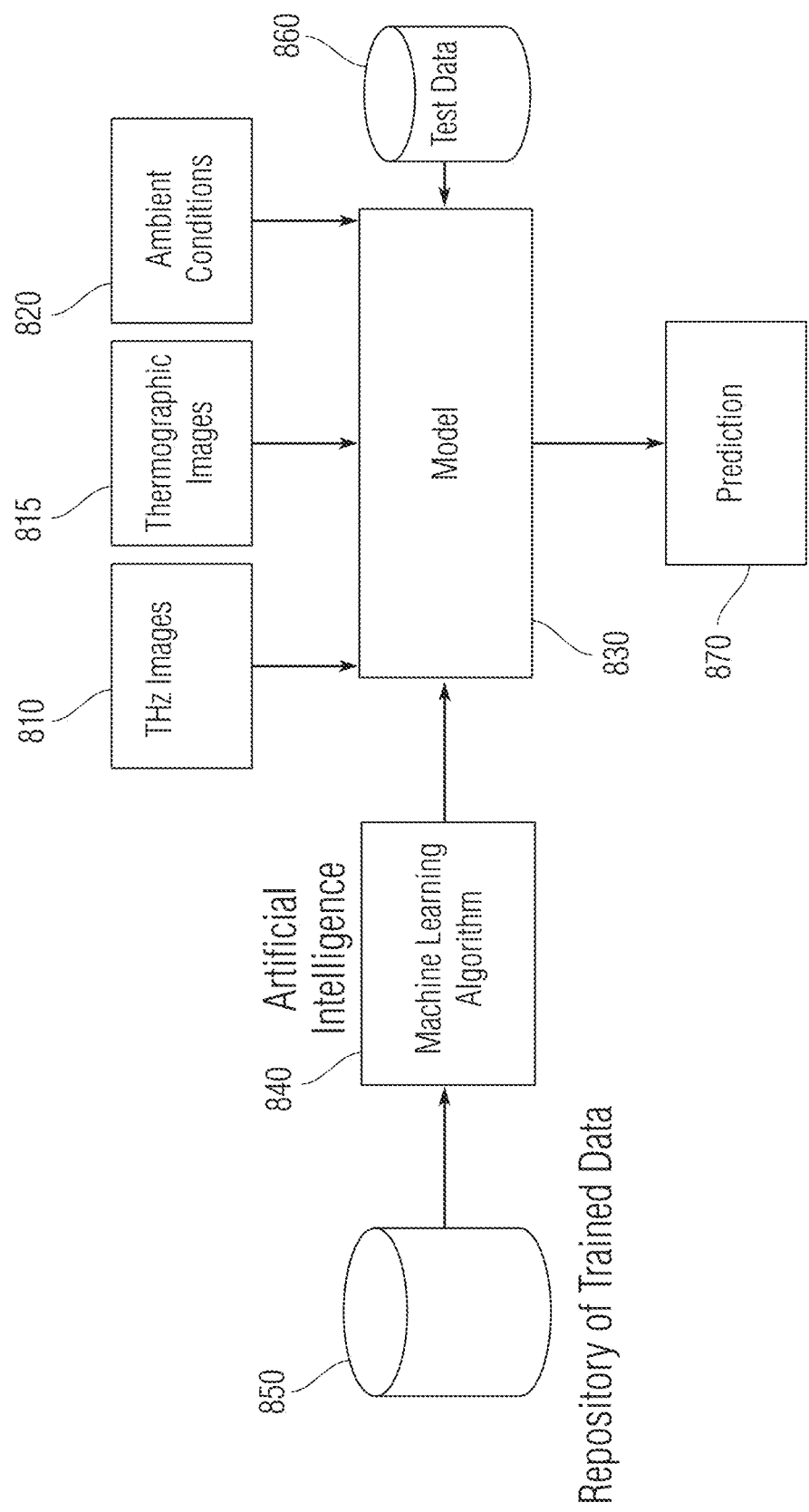
FIG. 9 is a block diagram of an embodiment of the machine learning scheme according to the present invention.

FIG. 9 is a block diagram of an embodiment of the machine learning scheme according to the present invention. As shown, THz image data 810 from the first detection apparatus, thermal image data 815 from the second detection apparatus, and ambient condition data 820 are supplied to a machine learning model 830. The model includes a set of numerical weights that are used as coefficients for the set of parameters that are used by the machine learning algorithm 840 to predict corrosion. In some implementations, parameters can include all of the pixels of the 2-dimensional images obtained from the THz and infrared detectors. The weights are applied to the pixel values. The parameters of the model also can include numerous other features, including the outside temperature, humidity, etc. received from the ambient sensors. The ambient conditions can be monitored using standard measurement techniques. The ambient condition information is fed to the model to account for features and behaviors that may arise and are consistent with the surroundings at which the structure is located.

The model 830 is also informed by training data 850 and test data 860. It is noted that the inputs to the model are asynchronous. The training data 850 is initially used to set the parameters of the model 830. Test data 860 is used then used in the model to determine the soundness and applicability of the model. This is done because in the process of training the model 830 using training data 850, the parameters of the model may too closely conform to the training data. This phenomenon is known as overfitting. The test data 860 is used to determine whether in fact the initial model 830 has overfit the training data and can help retrain the model to reduce any overfitting. After both the training data 850 and test data 860 have been used to train the model 830, current data received from onsite detection apparatus and ambient sensors can be entered into the model 830. From this information, the model outputs a prediction 870 as to whether the input data indicates the presence or absence of corrosion under fireproof insulation. As with all applications involving Artificial Intelligence, suitable accuracy in the prediction can generally be achieved when sufficient data is used to teach/train the algorithms on the expected outcomes from particular features. In the case of deep learning algorithms, in which the algorithms are capable of extracting new features and thereby "teaching" themselves, sufficient training data is still an important factor. Therefore, each inspection performed is not only useful in and of itself, but also because it provides additional data which can be used to refine the machine learning model.

As noted above, the predictions output from the model can cover localized or wide areas of a facility. For instance, there may be a concern with a particular asset and monitoring of THz and infrared radiation can be limited to the particular asset of concern. In other instances, a broad facility monitoring program is implemented, in which the purpose is to determine which areas and assets of the facility have the greatest likelihood of having corrosion damage. In the latter case, the model prediction can be used as a guide for remediation, in that areas or assets having a determined likelihood of corrosion damage which is greater than those areas or assets with comparatively less likelihood of corrosion damage can be distinguished from one another. Remediation efforts, including insulation removal, asset replacement, onsite repair, or other measures such as applying anti-corrosive chemicals, can be targeted to high-likelihood of corrosion assets and locations, saving a great deal of cost, man-power and time. Since the costs of damage can be very extensive, a "high" likelihood does not necessarily mean more likely than not, but can be set to a lower threshold such as a 25 percent likelihood of have corrosion damage. This measure aids in avoiding false negative readings and, therefore, the risk of preventing damage from going undetected.

The machine learning algorithm 840 can comprise one or more supervised deep learning algorithms that have been investigated and deemed suitable or corrosion detection including, for example, Convolutional Neural Networks (CNNs), Recurrent Neural Networks (RNNs), Ensemble Learning Methods, boosting methods such as Adaboost, Decision Trees and Support Vector Machines (SVMs). A combination of Convolutional and Recurrent Neural Networks is particularly suitable to CUF detection in that it combines the image-classification capabilities of Convolutional Neural Networks with the ability of Recurrent Neural Networks to classify patterns that occur over time. Using this combination, the focus is not only on detection of hotspots (corrosion incidents and susceptible locations to corrosion), but also on capturing the creation and development of these hotspots over time.

Figure 10:
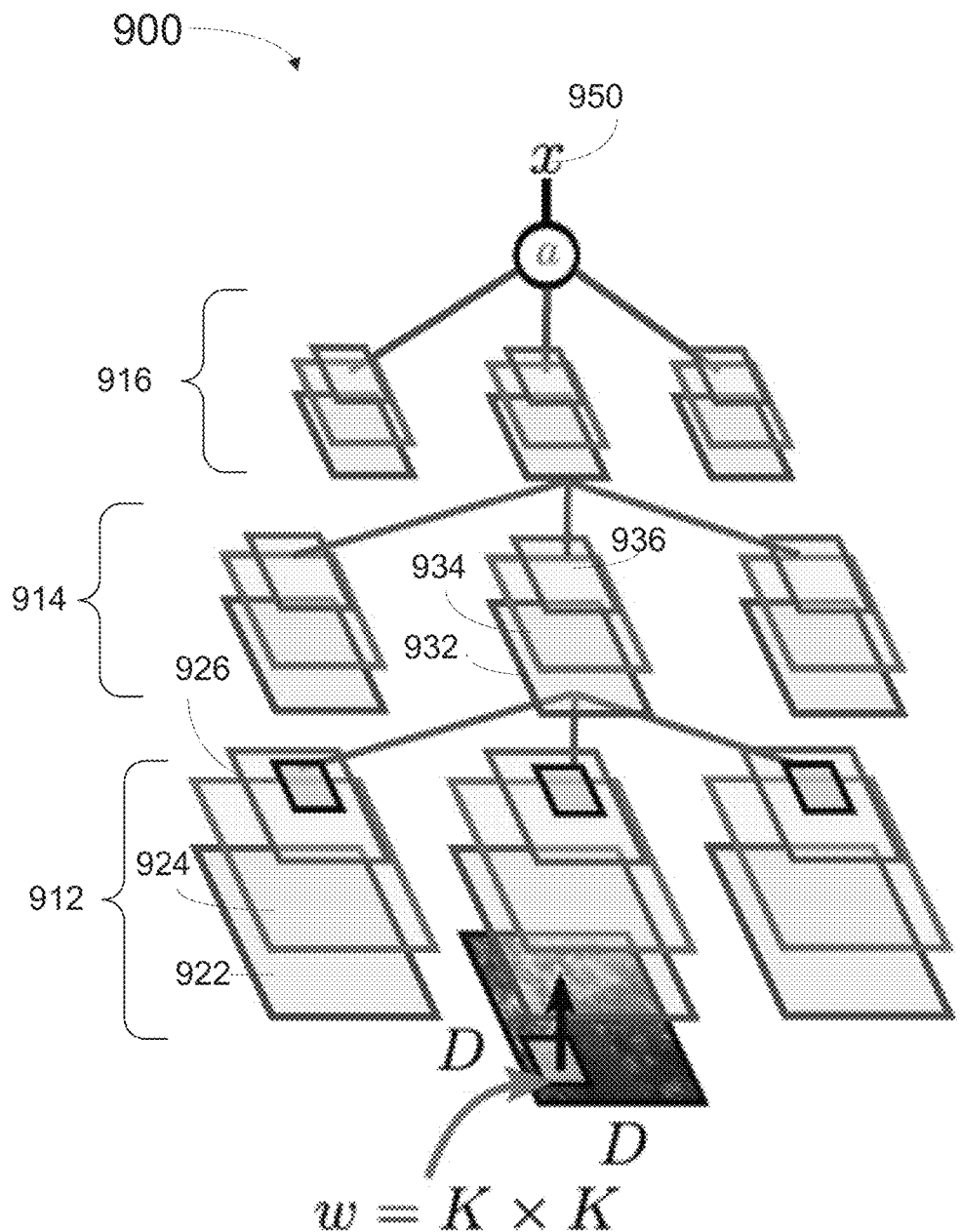
FIG. 10 is schematic illustration of an exemplary convolutional neural network (CNN).

A schematic illustration of an exemplary convolutional neural network (CNN) 900 that can be used in the context of the present invention is shown in FIG. 10. In the example shown, CNN 900 receives as input a localized section of an image 902. As shown, CNN 900 includes three hierarchical levels 912, 914, 916. It is noted that fewer or a larger number of hierarchical levels can be used. The first hierarchical level 912 includes three parallel processing paths, each processing path in turn including three distinct processing stages. This complex scheme can be clarified by explanation of the stages of a single processing path at a single level. Referring now to the leftmost path at the first hierarchical level, a first convolutional stage 922 applies a first convolution function (filter) to the input image data. It is noted that the other processing paths operate on another localized section of the input image. Each hierarchical level can apply a different convolution function to the data it receives to better identify features in the image. The filters can, for example, blur contrasts between neighboring image values by averaging, or, conversely, some filters can enhance differences to clarify edges. Each filter composes a local patch of lower-level features into higher-level representation. In this manner, edges can be discerned from pixels, shapes from can be discerned from edges, and so on.

The next stage of hierarchical layer 912 applies a non-linear function 924 to the data of the convolutional stage, such as a ReLU (rectified linear unit) or tan h function. This stage can be represented as $y_{i,j}=f(a_{i,j})$, in which f represents the non-linear function and $a_{i,j}$ represents is a pixel of the ith row and jth column from the output matrix of the convolution stage. The output of the non-linear function stage 924 is thus a modified version of the matrix output from convolutional stage 922. The final stage of hierarchical level 912 is a pooling stage 926 that can be used to simplify the data. For example, the pooling stage can apply a maximum function to output only the maximum value of the non-linear function of a number of rows and columns of pixels of the output matrix from the non-linear stage. After simplifying the data, the outputs of the pooling stages of all three processing paths can be summed and then input to the convolution stage 932 of one of the processing paths of the next hierarchical layer 914. In hierarchical layer 914, similar or different convolution matrices can be used to process the data received from the first hierarchical layer 912, and the same or different non-linear functions and simplification functions can be used in the following non-linear stage 934 and pooling stage 936. Output from the parallel processing paths of the second hierarchical layer 914 can be similarly pooled and then provided as an output matrix to the third hierarchical layer 916, in which further processing takes place. The final output 950 can be interpreted as a class label probability, or put another way, the most likely classification for the image. Classifications can include different types of hot spots indicative of temperature differentials and possible CUI.

The CNN learns by validation and backward propagation. This is equivalent to setting values of the output 950 and then running the algorithm backwards from the higher hierarchical layers to the lower layers and modifying the convolution matrices to yield better results using an optimization function. After training, the CNN should be able to accurately classify an input thermograph into one of the preset categories such as a hot spot, non-hot spot, etc. While the CNN is an efficient and useful methodology for stratifying input images into abstraction levels according to the thermograph image topology, it is not best suited for detecting patterns over time. Embodiments of the present invention therefore employ a recurrent neural network (RNN) in association with the CNN to improve time-based pattern recognition.

Figure 11:
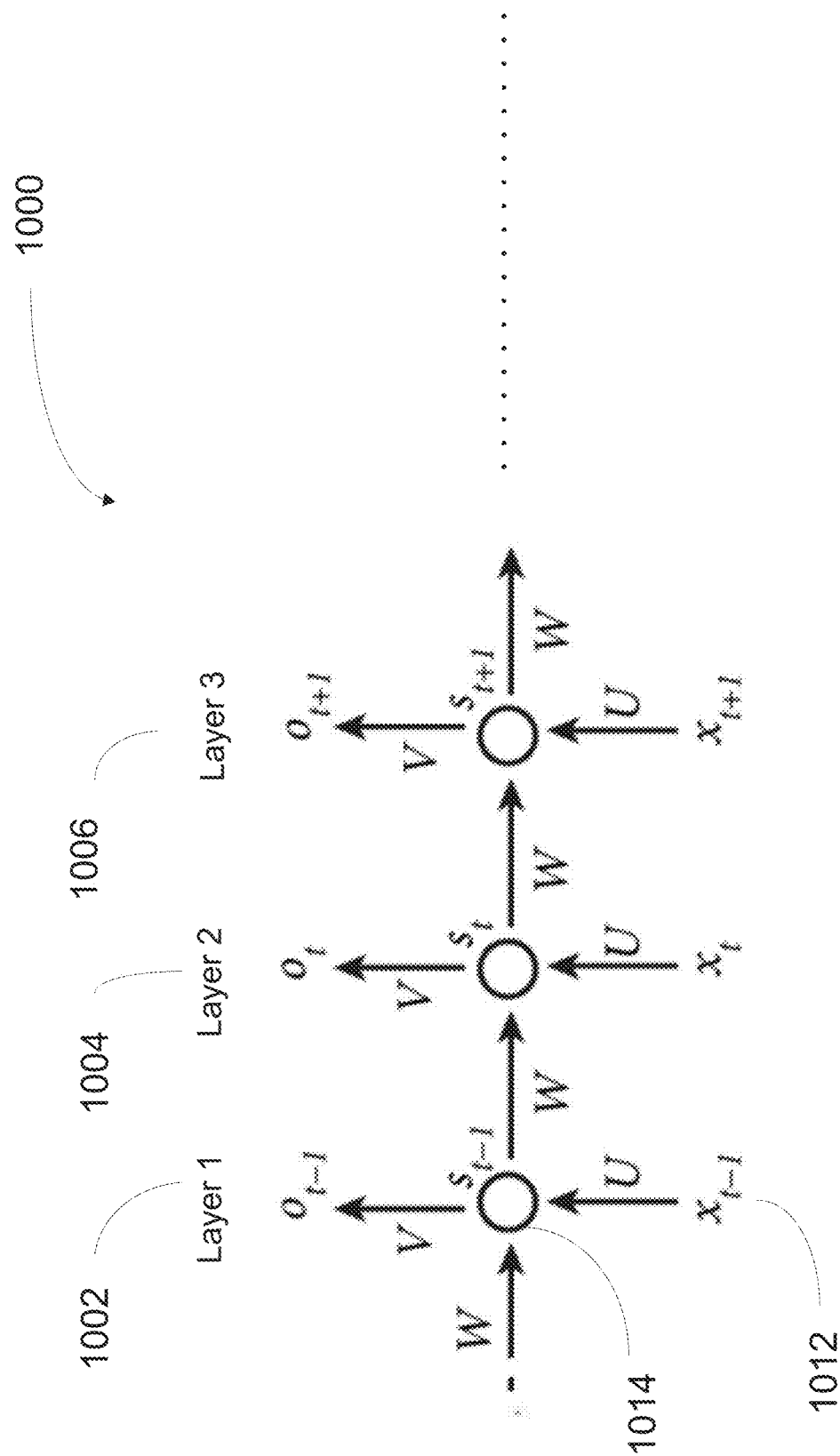
FIG. 11 is a schematic illustration of an exemplary recurrent neural network (RNN) that can be used in the context of the present invention

FIG. 11 is a schematic illustration of an exemplary recurrent neural network (RNN) 1000 that can be used in the context of the present invention. The RNN 1000 includes a number of layers of which three layers 1002, 1004, 1006 are explicitly shown. The RNN is best explained with reference to the second layer 1004. In this layer, xt is the input to the layer at time step t. The input xt 1012 can be a vector or matrix of values. St 514 represents the hidden state at time step t. The hidden state can be considered as the "memory" of the RNN. The hidden state is calculated based on the previous hidden state and the input at the current step: $s_t=f(Ux_t+Ws_{t-1})$. The function f is a typically a nonlinear function such as tan h or ReLU. The first hidden state is typically initialized to all zeroes. St is modified by parameter vector V to yield Ot, which is the output at step t. Ot can be interpreted as a matrix or vector of probabilities for the next state s+1. The RNN 1000 shares the same parameters (U, V, W above) across all steps. This reflects the fact that the same task at each step is performed at each step but with different inputs. This reduces the total number of parameters to learn, and thus also reduces processing time. While in the example shown, each layer has outputs at each time step, this is not necessary as in some implementation only the final output is of interest.

Furthermore, boosting algorithms, such as Adaboost, can be used in conjunction with neural network algorithms such as CNNs and RNNs to achieve higher accuracies at the expense of more computational time. Since boosting is mainly for combining and improving a big number of weak learners, the use of CNNs and RNNS would conventionally weigh against boosting, as both CNNs and RNNs are "strong" learners and require a significant time to train. However, with regard to corrosion detection, mistakes are extremely costly and thus increasing the accuracy at the expense of greater computational time is considered to be an acceptable trade-off. Additionally, use of boosting algorithms is helpful during the design phase neural network algorithms and for selecting optical architectures for both CNNs and RNNs.

Aspects of the present invention provide numerous additional advantages over the related art. Since physical removal of the insulation is not required, and monitoring occurs at a distance from the structure, extensive scaffolding is not required for facility corrosion monitoring. Because monitoring occurs remotely and there is no requirement for visual inspection, the techniques disclosed can provide an inspection platform that can be operated at any time. Furthermore, inspection is not limited as is the conventional approach to localized regions of possible interest based on prior experience and assumptions. The level of training and expertise required to operate the THz and infrared detector apparatus of the present invention and related user platforms is not particularly high, especially when compared to other attempted remote detection techniques such as X-ray and neutron back-scattering.

To increase convenience of use, the present system and methods are implemented on a user-friendly platform with user interfaces that require minimum operator training. In addition, results generated from the machine learning algorithm can be fed directly to an on-site/off-site control room where the health of all fireproofed assets can be monitored continuously.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for predicting and detecting of corrosion under fireproof insulation (CUF) in an infrastructure asset comprising:
    a first detection apparatus adapted to capture thermal images of the asset;
    a second detection apparatus adapted to receive THz radiation from the asset;
    at least one ambient condition sensor for detecting environmental conditions at a location of the asset;
    a communication device coupled to the first and second detection apparatus and at least one ambient condition sensor to receive data therefrom and adapted to communicate the received data; and
    a computing device communicatively coupled to the communication device and configured with instructions for executing a machine learning algorithm taking as inputs the thermal image, THz and ambient condition data received from the communication device, and to output a CUF prediction regarding the asset;
    wherein the prediction distinguishes locations on the asset that have a high likelihood of CUF from those having a low likelihood of CUF.

2. The system of claim 1, wherein the first detection apparatus includes an infrared camera.

3. The system of claim 1, wherein the second detection apparatus includes a THz emitter and a THz detector.

4. The system of claim 1, wherein the at least one ambient sensor is operative to detect at least one of temperature, humidity and air pressure.

5. The system of claim 1, wherein the machine learning algorithm employed by the computing system includes a deep convolutional neural network.

6. The system of claim 1, wherein the machine learning algorithm employed by the at least one computing system includes a deep recurrent neural network.

7. The system of claim 6, wherein the machine learning algorithm employed by the computing system further includes a deep convolutional neural network.

8. The system of claim 7, wherein the computing system is configured with instructions for executing a boosting algorithm to increase prediction accuracy.

9. The system of claim 8, wherein the boosting algorithm is Adaboost.

10. The system of claim 1, wherein the first detection apparatus is positioned in a range of about 5 to about 15 meters away from the asset while detecting infrared radiation coming from the asset, and the second detection apparatus is positioned in a range of 0.1 to about 2.2 meters away from the asset while detecting THz radiation coming from the asset.

11. A method of predicting and detecting of corrosion under fireproof insulation (CUF) in an infrastructure asset:
    capturing thermal image data emitted or reflected from the asset over time;
    capturing THz data of the asset reflected from the asset over time;
    measuring ambient conditions to obtain ambient condition data over time;
    communicating the captured thermal image, THz and ambient condition data to a computing system configured with a supervised machine learning algorithm;
    executing the machine learning algorithm using the thermal image, THz and ambient condition data, wherein execution of the machine learning algorithm yields a prediction as to whether the asset contains corrosion under the insulation; and
    performing remedial measures on the asset if it is predicted that the asset contains corrosion under the insulation.

12. The method of claim 11, wherein the step of capturing thermal image data is performed by positioning an infrared detector between about 5 meters to about 15 meters away from the asset.

13. The method of claim 11, wherein the step of capturing THz data is performed by positioning a THz emitter and THz detector between about 0.1 meters to about 2.2 meters away from the asset.

14. The method of claim 11, wherein the ambient condition data includes at least one of least one of temperature, humidity and air pressure.

15. The method of claim 11, wherein the step of executing the machine learning algorithm includes employing a convolutional deep neural network to classify thermal image and THz data.

16. The method of claim 11, wherein the step of executing the machine learning algorithm further includes employing a recurrent deep neural network to analyze the thermal image and THz data over time in view of the ambient condition data.

17. The method of claim 11, wherein the step of executing the machine learning algorithm includes employing both a convolutional deep neural network to classify thermal image and THz data and a recurrent deep neural network to analyze the thermal image and THz data over time in view of the ambient condition data.

18. The method of claim 17, further comprising executing a boosting algorithm to increase accuracy of the machine learning algorithm.

19. The method of claim 18, wherein the boosting algorithm is Adaboost.

20. The system of claim 1, wherein:
the first detection apparatus includes an infrared camera;
the second detection apparatus includes a THz emitter and a THz detector;
the at least one ambient sensor is operative to detect at least one of temperature, humidity and air pressure; and
the first detection apparatus is positioned in a range of about 5 to about 15 meters away from the asset while detecting infrared radiation coming from the asset using the infrared camera, and the second detection apparatus is positioned in a range of 0.1 to about 2.2 meters away from the asset while detecting THz radiation coming from the asset using the THZ emitter and the THZ detector.

* * * * *